H. W. LINABURRY.
VEHICLE SPRING.
APPLICATION FILED MAR. 18, 1919.
1,368,514
Patented Feb. 15, 1921.
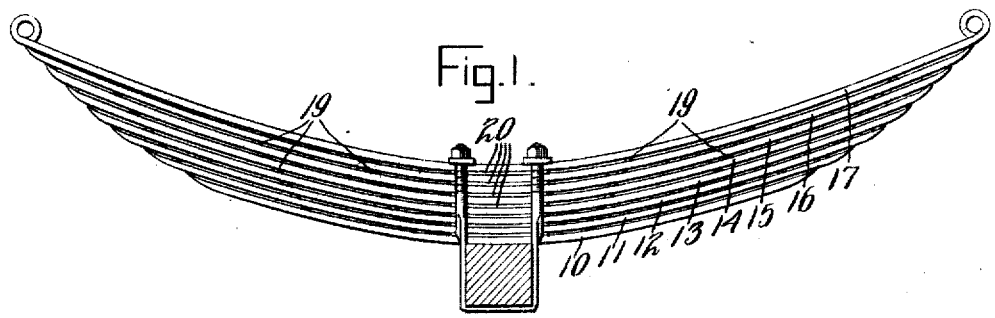
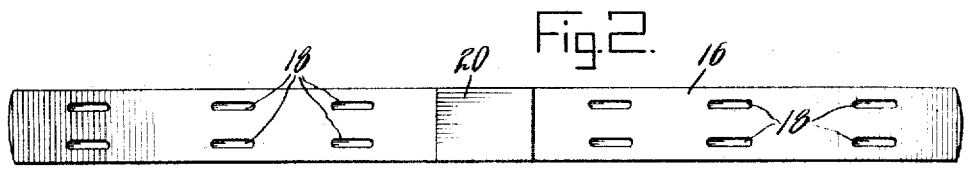
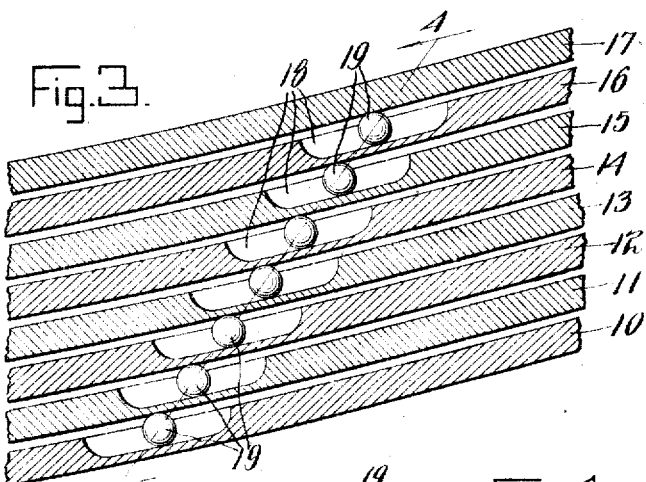
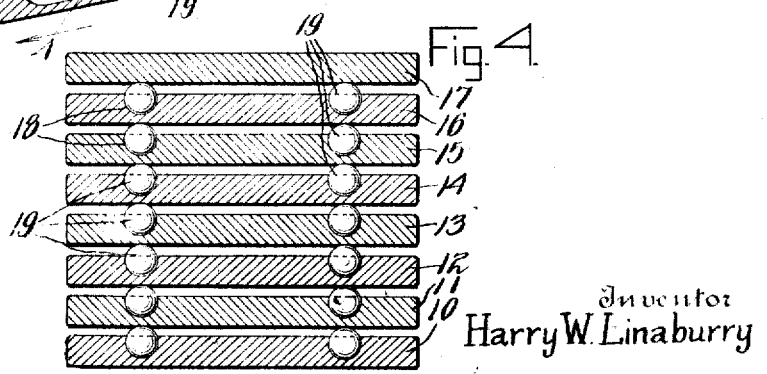
Inventor
Harry W. Linaburry
By
Eli Bradford
Attorney

UNITED STATES PATENT OFFICE.

HARRY W. LINABURRY, OF INDIANAPOLIS, INDIANA, ASSIGNOR OF ONE-HALF TO WILLIAM R. HIRST, OF INDIANAPOLIS, INDIANA.

VEHICLE-SPRING.

1,368,514.

Specification of Letters Patent.   Patented Feb. 15, 1921.

Application filed March 18, 1919. Serial No. 283,351.

*To all whom it may concern:*

Be it known that I, HARRY W. LINABURRY, a citizen of the United States, residing at Indianapolis, Marion county, and State of Indiana, have invented and discovered certain new and useful Improvements in Vehicle-Springs, of which the following is a specification.

My said invention relates to an improved construction of leaf springs especially designed for vehicle springs of that type wherein anti-friction devices are interposed between the leaves thereof, and it consists in certain improvements in the details of construction whereby a spring of this type is provided in which the adjacent surfaces of the leaves composing the spring are kept separated throughout their lengths, an efficient means of lubrication provided, and a very flexible and responsively operating construction secured, all as will be hereinafter more fully described and claimed.

Referring to the accompanying drawings, which are made a part hereof and on which similar reference characters indicate similar parts, Figure 1 is a side elevation of a spring constructed in accordance with my said invention, Fig. 2, a plan view of one leaf of said spring, as leaf 16, Fig. 3, a detail longitudinal section, and Fig. 4, a cross section on the line 4—4 in Fig. 3.

In said drawings the several leaves of the spring are indicated by the numerals 10, 11, 12, 13, 14, 15, 16 and 17, respectively. These leaves are of a common form in general construction and are assembled in the usual manner, the top leaf being a long leaf with eyes in its ends for attachment to the coupling members and the other leaves of gradually decreasing length, as shown.

In the concave side of each of said leaves are formed a series of grooves or depressions 18, which are distributed at intervals throughout the length of each leaf and are of sufficient length to permit balls mounted therein to roll back and forth such a distance as required to enable the load to be carried entirely by said balls and the surfaces of the leaves held slightly separated throughout their lengths. To this end the grooves 18 are distributed at intervals throughout the length of the leaves and are so arranged in the adjacent leaves that one groove is not immediately in line with the grooves in the adjacent leaves, so that the balls do not come immediately one above another. The grooves are also formed in rows distributed at appropriate positions relative to the width of the leaves.

Mounted in each of said grooves is a ball 19 of a diameter sufficient to hold the leaf bearing thereon spaced slightly from the surface of the leaf in which it is mounted. At the center of said leaves are mounted spacing blocks 20 of fiber, fabric, or any suitable material which hold the leaves apart at this point an appropriate distance.

Said grooves 18 not only serve as ball races in which the balls 19 may run but also as cups in which the lubricant may be deposited and contained thus insuring a very easy and flexible operation of the spring.

By reason of having the balls distributed in respect to the length and the width of the springs the leaves are held apart throughout all portions and frictional resistance between the leaves is eliminated, enabling them to work more freely, one upon the other, resulting in less shock to the vehicle and reducing the rebound to a minimum. All squeaks inherent to the operation of springs of the usual construction are also eliminated.

The construction also enables the spring to be cleansed and lubricated very conveniently by turning a hose on the side of the spring, which forces water through the spaces between the leaves and washes out all accumulated dirt. It also permits oil to be introduced easily and retained by said pocket or ball races. It entirely eliminates the "freezing" of the leaves, one to the other by means of rust.

Having thus fully described my said invention, what I claim as new and desire to secure by Letters Patent, is:

1. A vehicle spring composed of leaves mounted one upon another, the several leaves under the top leaf being formed with a series of grooves or pockets of a length to serve as short ball races and oil retaining cups and positioned with respect to each other so that the grooves in one leaf are in overlapping relation with the grooves in adjacent leaves, and balls mounted in said grooves of a diameter to hold said leaves slightly separated, substantially as set forth.

2. A vehicle spring comprising a plurality of leaves disposed one upon another the leaves below the top being formed with longitudinally extending grooves in their top surfaces at intervals throughout their length, the grooves of one leaf only partially overlapping the grooves of an underlying leaf, and balls mounted therein of less diameter than the length of said grooves, substantially as set forth.

3. A vehicle spring composed of a plurality of leaves disposed one upon another and formed with grooves in their top faces for retaining balls and oil, balls in said grooves between said leaves of a diameter to space the leaves apart, the grooves of one leaf only partially overlapping the grooves of an underlying leaf and said grooves exceeding in length the diameter of the balls which are mounted to roll therein, and an upper leaf covering and bearing upon the uppermost balls, substantially as set forth.

In witness whereof, I have hereunto set my hand and seal at Indianapolis, Indiana, this 19th day of February, A. D. nineteen hundred and nineteen.

HARRY W. LINABURRY. [L. S.]

Witnesses:
    E. W. BRADFORD,
    M. L. SHULER.